UNITED STATES PATENT OFFICE.

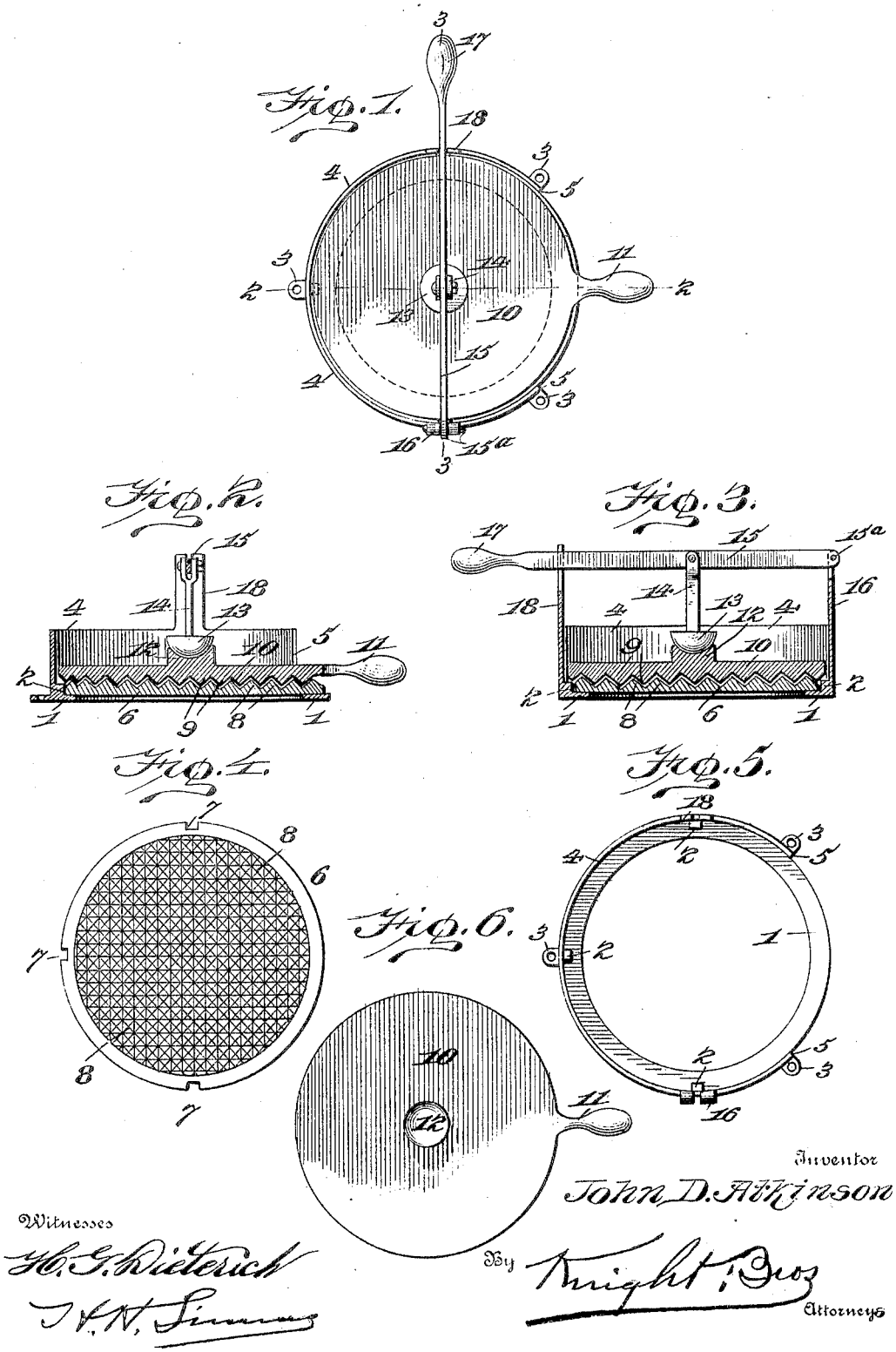

JOHN D. ATKINSON, OF OLYMPIA, WASHINGTON.

MEAT-TENDERING MACHINE.

No. 802,729.                     Specification of Letters Patent.                     Patented Oct. 24, 1905.

Application filed April 20, 1904. Serial No. 204,110.

*To all whom it may concern:*

Be it known that I, JOHN D. ATKINSON, a citizen of the United States, residing at Olympia, in the county of Thurston and State of Washington, have invented certain new and useful Improvements in Meat-Tendering Machines, of which the following is a specification.

This invention relates to meat-tenderers; and it has for its object to provide an improved device of this kind in which the fibers of the meat may be quickly and thoroughly disintegrated.

Other objects and advantages will appear in the following description and will be more particularly pointed out in the appended claims.

In the drawings, Figure 1 is a top plan view of my invention. Fig. 2 is a vertical section on the line 2 2, Fig. 1. Fig. 3 is a vertical section on the line 3 3, Fig. 1. Fig. 4 is a top plan view of the lower stationary disintegrating-disk. Fig. 5 is a top plan view of the frame with the disks and pressing-lever removed. Fig. 6 is a top plan view of the upper movable disk.

Referring more particularly to the drawings, 1 indicates an annular base of the frame provided with holding-lugs 2 at several points on its upper surface near its perimeter and attaching-lugs 3 extending from the same. A vertical wall 4 projects upwardly from the base 1 and is provided with an opening 5 for a purpose to be hereinafter mentioned. Resting loosely on the base is a stationary disintegrating-disk 6, provided with notches 7, in which fit the lugs 2 to hold the said disk against rotary movement and to permit the same to be easily removed for the purpose of cleaning. The disk is provided with pyramidal-shaped teeth 8, which coöperate with like teeth 9 on an oscillatory disintegrating-disk 10, which is adapted to be disposed above the lower stationary disk, and between which disks the meat to be treated is placed. This upper oscillatory disk is provided with a handle 11, which projects through the opening 5 in the wall 4 of the frame and limits the oscillating movement of the said upper disk. A concave seat 12 is also provided on the upper disk, which permits the same to rotate and at the same time forms a bearing for the convex end 13 of an arm 14, secured intermediate the ends of a pressing-lever 15. The pressing-lever 15 is pivoted at one of its ends 15$^a$ in a bifurcated post 16 on the wall 4, and its other end is provided with a grip 17 and works in a bifurcated guide-post 18 on the wall opposite the post 16.

The operation of the invention is as follows: Assuming the parts to be in a position as shown in Figs. 1 to 3 and it is desired to tender a piece of meat, the grip 17 is grasped and the lever 15 is thrown upwardly on its pivot 15$^a$, carrying the arm 14 therewith. The disk 10 may now be removed and the meat placed on the lower disk 6. The upper disk 10 is now placed on the meat and the lever 15 is thrown to the position shown in Figs. 1 to 3, pressure being applied to the grip 17. Upon oscillating the disk 10 the distance of the opening 5 through the medium of the handle 11, the movement of which is limited by the end walls of the opening, the meat will be torn or ground between the teeth 8 and 9 of the disks. Only one movement of the handle the distance of the opening is usually required to completely treat the meat. So it is seen that the labor of tendering meat is materially lessened. The parts being removable may be easily cleaned.

I desire it to be understood that I may make various changes in the form, the proportion, and the minor details of my invention without departing from the spirit or sacrificing any of the advantages of my invention.

What I claim is—

1. A meat-tenderer comprising a base, a fixed disk having meat-tendering teeth removably mounted on the base, an oscillatory disk having meat-tendering teeth for coöperation with the fixed disk, a manual-pressure device secured to the base and coöperating with the oscillatory disk, a handle for oscillating the latter disk independent of the manual-pressure device, and means for limiting the movement of the oscillatory disk.

2. The combination of a base, a stationary disk removably secured thereto, a wall surrounding the stationary disk, supported from the base, and provided with an opening, an oscillatory disk provided with a handle extending through the opening in the wall and a concave seat in its upper surface, a lever pivoted at one end to the wall and provided with a grip at its other end, and an arm carried by the lever and having a convex end to bear against the concave seat on the oscillatory disk.

The foregoing specification signed this 5th day of April, 1904.

JOHN D. ATKINSON.

In presence of—
  E. B. WHITON,
  VAUGHN TANNER.